United States Patent [19]

Liu

[11] Patent Number: 4,537,503

[45] Date of Patent: Aug. 27, 1985

[54] MULTIPLE MEASURING CONTROL VOLUME LASER DOPPLER ANEMOMETER

[75] Inventor: Dirkson D. S. Liu, Ottawa, Canada

[73] Assignee: Atomic Energy of Canada Limited, Ottawa, Canada

[21] Appl. No.: 417,191

[22] Filed: Sep. 10, 1982

[30] Foreign Application Priority Data

Dec. 22, 1981 [CA] Canada ................................ 393182

[51] Int. Cl.³ .............................................. G01P 3/36
[52] U.S. Cl. ...................................... 356/28.5; 356/28
[58] Field of Search ................................. 356/28.5, 28

[56] References Cited

U.S. PATENT DOCUMENTS

| | | | |
|---|---|---|---|
| 3,830,568 | 8/1974 | Allen | 356/28.5 |
| 3,860,342 | 1/1975 | Orloff et al. | 356/28.5 |
| 3,897,152 | 7/1975 | Farmer et al. | 356/28.5 |
| 4,148,585 | 4/1979 | Bargeron et al. | 356/28.5 |

FOREIGN PATENT DOCUMENTS

| | | | |
|---|---|---|---|
| 0095883 | 7/1980 | Japan | 356/28.5 |
| 1524830 | 9/1978 | United Kingdom | 356/28.5 |

OTHER PUBLICATIONS

Aponin et al, "Laser-Doppler Velocity-Profile Meter," Instrum. and Exp. Tech. (USA), vol. 19, No. 4, (Jul.-Aug. 1976) (Publ. Feb. 1977), pp. 1186-1188.

Avidor, J. M., "Novel Instantaneous Laser Doppler Velocimeter," Applied Optics, vol. 13, No. 2, 2/74, pp. 280-285.

Oldengarm, J., "Development of Rotating Diffraction Gratings and Their Use in Laser Anemometry," Optics and Laser Tech., 4/77.

Nakatani et al, "LDV Optical System with Multifrequency Shifting for Simultaneous Measurement of Flow Velocities at Several Points," J. Phys. E: Sci. Instrum., vol. 13, No. 2, 2/80, pp. 172-173.

Primary Examiner—S. C. Buczinski
Attorney, Agent, or Firm—Edward Rymek

[57] ABSTRACT

The multiple measuring control volume laser Doppler anemometer includes a laser for providing an optical beam. The beam is transformed by an optical arrangement to produce a number V of measuring control volumes wherein each control volume has two focussed optical beams intersecting at a unique predetermined angle $\phi$. A detector collects the scattered light from the measuring control volumes in order to determine the velocity at each of the control volumes.

8 Claims, 11 Drawing Figures

MULTIPLE MEASURING CONTROL VOLUME LASER DOPPLER ANEMOMETER

BACKGROUND OF THE INVENTION

This invention relates to a laser Doppler anemometer for measuring transient velocity distributions of a flowing fluid, and, more particularly, to a multiple measuring-control volume anemometer in which the velocity may be measured at a number of points at one time.

The use of laser Doppler anemometers to measure velocities have been in use for some time. In the basic anemometer a beam is split and then focussed to intersect at a point (the measuring-control volume) where the velocity is measured by detecting the Doppler frequency shift in the scattered light. However, if it were desired to measure the velocity profile in a fluid, the measuring control volume would have to be shifted to different points in the moving fluid. This would not normally be adequate for measuring transient flows, because the time required to complete a set of measurements consisting of a number of local velocities to define the profile could not be made before the instantaneous velocity is significantly changed.

In order to measure the velocity profile within a period of relatively much shorter than the momentary change, multiple control volume anemometers, such as the one described in U.S. Pat. No. 3,830,568, which issued on Aug. 20, 1974 to John B. Allen, were developed. This instrument provides a device of determining the velocity profile very close to the actual case. However, the multiple measuring control volumes have the same geometry and will generate the same laser Doppler frequencies when particles with the same velocity and direction pass through any one of the measuring control volume. The instrument, therefore, requires one detecting system for each measuring-control volume to avoid spatial ambiguity and to resolve the velocity differences.

In a publication entitled, "LDV Optical System with Multifrequency Shifting for Simultaneous Measurement of Flow Velocities at Several Points" by N. Nakatani et al, J. Phys. E: Sci. Instr., Vol. 13, pp 172-173, 1980, the need for one detecting system for each measuring-control volume is eliminated by using a rotating radial diffraction grating which will generate several beams with different frequencies. These beams render each of the measuring control volume distinctive such that the scattered light from all of them can be detected by a single photodetector from which the velocity in each volume can be determined. Such a system however can be rather expensive since resolution of signals is limited by the number of grating grooves and the driving motor speed which are both very cost dependent. In addition, for each spatial resolution, a lens of specific focal distance is required, which renders this system inflexible in application.

SUMMARY OF THE INVENTION

It is therefore an object of this invention to provide a multiple measuring-control volume laser Doppler anemometer requiring a minimum number of detection circuits.

This and other objects are achieved in a multiple measuring control volume laser Doppler anemometer which includes a laser for generating an optical beam, and an optical arrangement for transforming the optical beam so as to produce a number V of increasing control volumes where each control volume has two focussed optical beams intersecting at a unique predetermined angle $\phi$. The anemometer further includes a detector which collects the scattered light from the measuring control volumes in order to determine the velocity at each of the control volumes.

Many optical arrangements may be used to produce the intersecting beams, however, it is preferred that the bisecting axes of the intersecting beams in all of the control volumes lie along a common plane in order to accurately measure velocity vectors which are coplanar.

In most applications, a single detector would be sufficient, however, when a large number of closely spaced control volumes are used, it may be preferably to have two or more detectors for detecting the light from adjacent control volumes so as to resolve the small differences in the signals in adjacent volumes.

Many other objects and aspects of the invention will be clear from the detailed description of the drawings.

DETAILED DESCRIPTION

Figures 1, 2, 3:
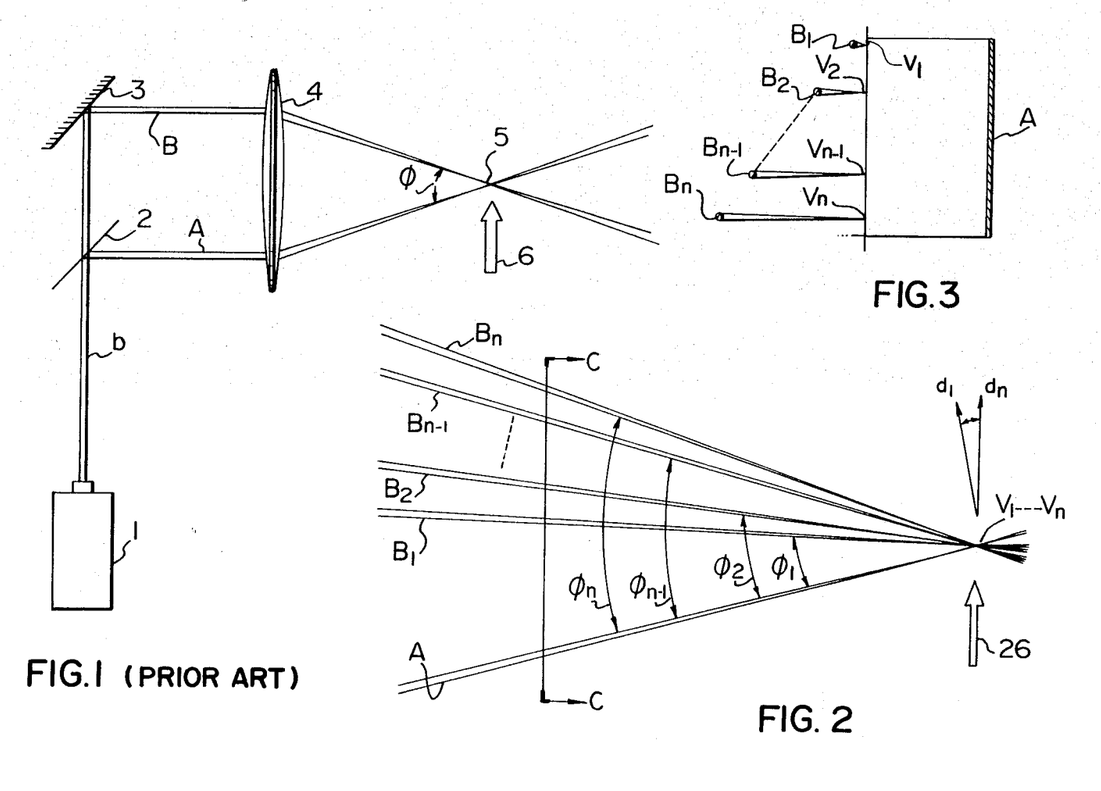
FIG. 1 illustrates the forming of a single measuring control volume in a conventional anemometer.
FIGS. 2 and 3 illustrate the forming of unique control volumes in accordance with the present invention.

The optics of a laser Doppler anemometer (LDA) is used to focus two monochromatic light beams on a small volume, namely the measuring control volume, in which the two beams must be planar waves. FIG. 1 shows a typical example of an LDA operating in the dual-beam mode. In this system, the beam, b, from a laser 1 is split into two beams, A and B, by a beam splitter 2. These splits beams A and B are then made parallel by a mirror 3 and focussed by a lens 4 to a single point 5, known as the measuring control volume. The general principles for constructing an LDA are described in the text—"Principles and Practice of Laser-Doppler Anemometry" by F. Durst et al, Academic Press, London, 1976. Velocity measurement is based on detecting the Doppler frequency shift in the scattered optical beam induced by particles moving through the measuring control volume 5.

The measured velocity component is in the direction perpendicular to the bisecting axis of the light beams A and B, as represented by flow arrow 6 which is in the plane containing the light beams A and B, and which is also the plane of the drawing. Because of their direction relative to flow, beam A will endure a slight increase in frequency while beam B will endure a slight decrease in frequency, resulting in a frequency difference between the beams A and B which is dependent on velocity.

The velocity, U, is determined by the following relation:

$$U = \frac{\lambda F_D}{2 \sin (\phi/2)}$$

where
$\lambda$ = the wavelength of the laser beams A and B
$F_D$ = detected Doppler frequency induced by moving particles
$\phi$ = the bisecting angle of the laser beams A and B.

FIGS. 2 and 3 illustrate two views of the measuring control volumes produced in accordance with the present invention, where FIG. 3 is a cross-section of FIG. 2 taken along line C—C. Each measuring control volume $V_1$–$V_n$ is produced by intersecting pairs of focussed optical beams A and $B_1 \ldots B_n$ at a number of points in the flow path as represented by arrow 26. The volumes $V_1$ to $V_n$ are each unique in that the intersecting angles $\phi_1$ to $\phi_n$ between the pairs of beams forming the volumes all differ from one another. Since the scattered light from each measuring control volume has its own signature, because of the different angles $\phi$, all of the scattered light may be detected by one or a small number of detector circuits, wherein the individual velocities for each volume V is determined by processing circuits.

Beam A may consist of a single wide beam as shown in FIG. 2 or 3, or it may consist of a series n of narrow beams, i.e. one for each volume V to be produced.

Figures 4, 5:
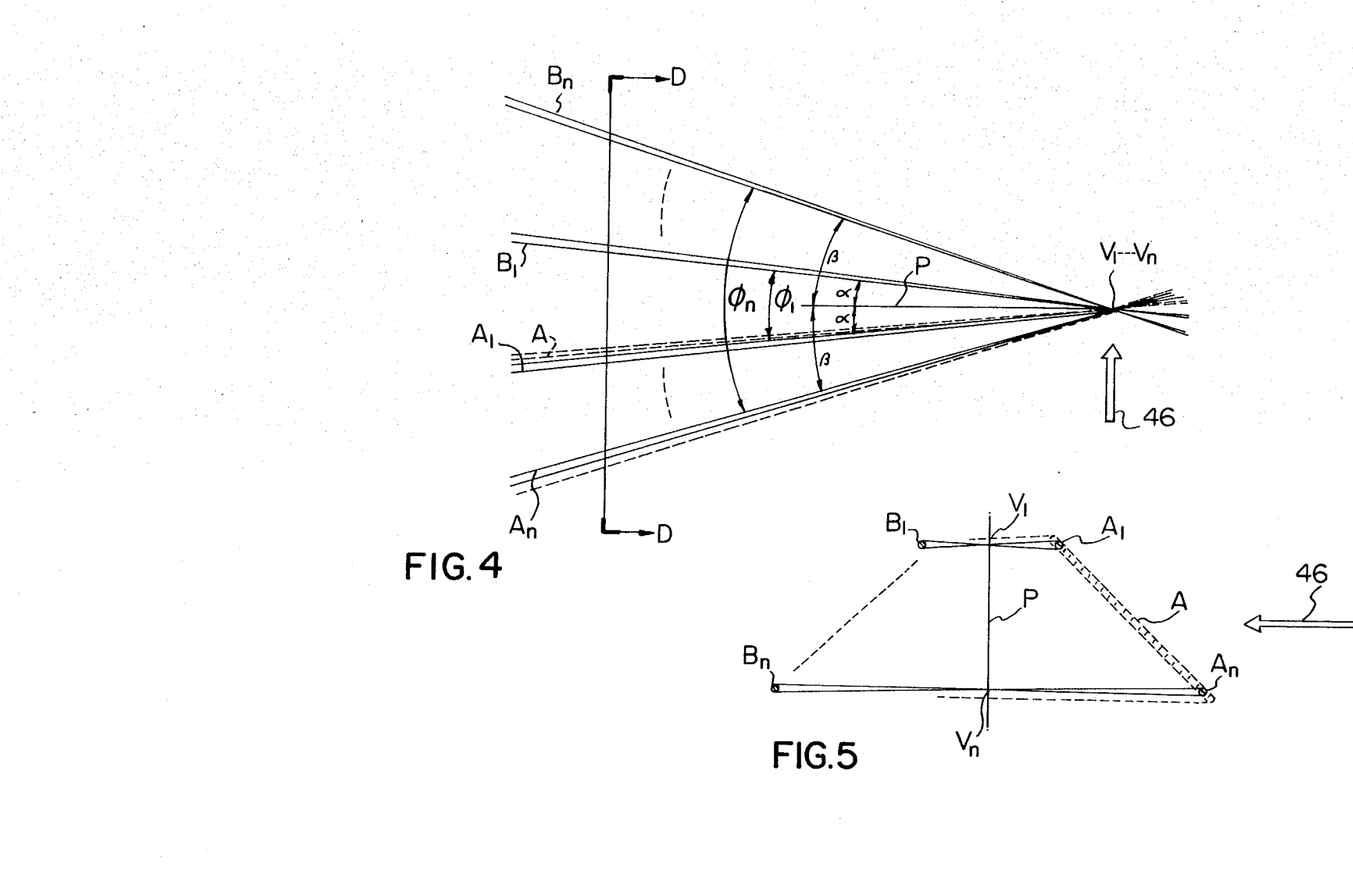
FIGS. 4 and 5 illustrate control volumes with a common bisecting axes for the intersecting beams.

For the system shown in FIGS. 2 and 3, the directions of the measured velocity components for each volume V will be slightly different since this direction is perpendicular to the bisecting axis of the light beams A and B for each volume. As shown in FIG. 2, this difference in direction varies from $d_1$ to $d_n$. Normally, this is not a major problem since in a practical device, this difference is slight. However, in cases where this error may become significant, the beam pairs for each volume may be arranged to have their bisecting axes fall in a common plane P, as illustrated in FIGS. 4 and 5, where FIG. 5 is a cross-section taken along section D—D in FIG. 4. The beam pairs $A_1$-$B_1$, . . . $A_n$-$B_n$ have intersecting angles $\phi_1 \ldots \phi_n$, which increase from one volume to the next, i.e. $V_1 \ldots V_n$, however, the bisecting axis for each intersecting angle falls within the plane P, which is perpendicular to the flow direction represented by arrow 46.

Also, as shown in FIGS. 4 and 5, the same effect may be achieved by replacing the beams $A_1 \ldots A_n$ by a single wide beam A which intersects at volumes $V_1 \ldots V_n$ with beams $B_1 \ldots B_n$. It is to be noted that both beam sets $A_1 \ldots A_n$ and $B_1 \ldots B_n$ cannot be replaced by single wide beams when using a single detection system since discrete volumes $V_1 \ldots V_n$ are required to determine velocity. However, either set of beams $A_1 \ldots A_n$ or $B_1 \ldots B_n$ may be replaced by a single broad beam.

FIGS. 6 to 10 illustrate various optical configurations by which the desired control volumes may be obtained. A beam 60a of circular cross-section is generated by a laser 61 which may be of any known type such as a 15 mW He-Ne laser. However, more powerful lasers may be used in systems which have numerous measuring control volumes.

Figure 6:
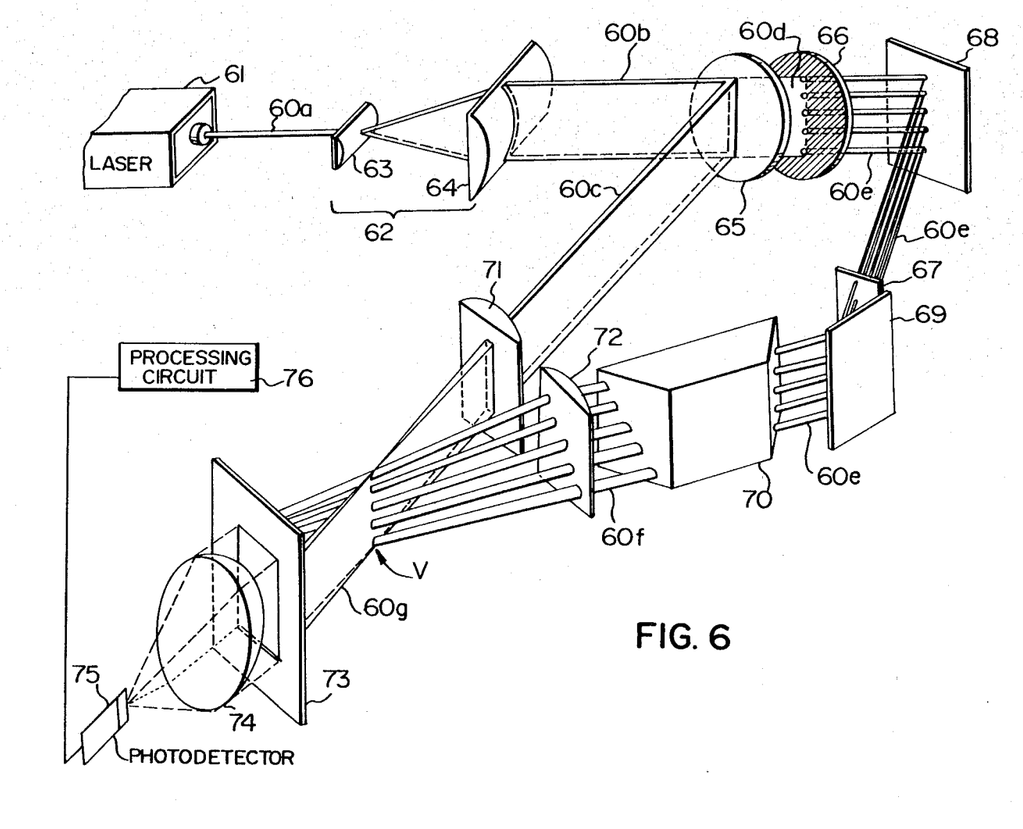
FIG. 6 illustrates an optical arrangement utilizing a beam positioner.

FIG. 6, the beam 60a cross-section is expanded into an elongated elliptical beam 60b by a reversed rectangular telescope 62 consisting of two cylindrical lenses 63 and 64. The elongated beam 60b is split into two components 60c and 60d by a beam splitter 65. The beam 60d is gated into multiple beams 60e, all at zeroth order, by a beam positioner 66 and an order selector 67, which each consist of diaphragms or slits. Mirrors 68 and 69 are used to properly redirect the beams 60e within the system, with mirror 69 directing the beams 60e to apparatus for providing rotated beams 60f which are at preselected angles with respect to beam 60c. The rotating apparatus may be a dove prism 70, as shown, or a beam rotator assembled from mirrors in the conventional manner. The beams 60c and 60f, which are now properly arranged, are focussed on a straight line by one cylindrical lens or a pair of cylindrical lenses, 71 and 72, to form the measuring control volumes V. The volumes V are located in the cross-section of fluid flow, the velocity of which is to be measured. The original laser light, after passing through the measuring control volumes V, 60g is blocked out by a beam stopper 73. This device allows only the scatter light, not shown because it is not coherent, to pass through. The scattered light is then focussed by a lens 74 onto a detector circuit. The detector circuit includes a photodetector 75 which may be a photomultiplier or a photodiode, where the scattered light is detected and converterd to an electrical signal.

The electrical signal is fed to a processing circuit 76 which includes a frequency discriminator such as a spectrum analyser, a frequency counter or a frequency tracker for analysing the electrical signal in order to obtain $F_D$ for each measuring control volume. The processing circuit 76 will also include a readout device such as a scope, a digital voltage meter, or the like for providing a velocity readout in each control volume. The photodetector 75 will normally be located somewhere on the plane P (FIGS. 4 and 5) at a convenient distance from the volumes $V_1$ to $V_n$, such that the scattered light may be focussed on the photodetector 75.

Figure 7:
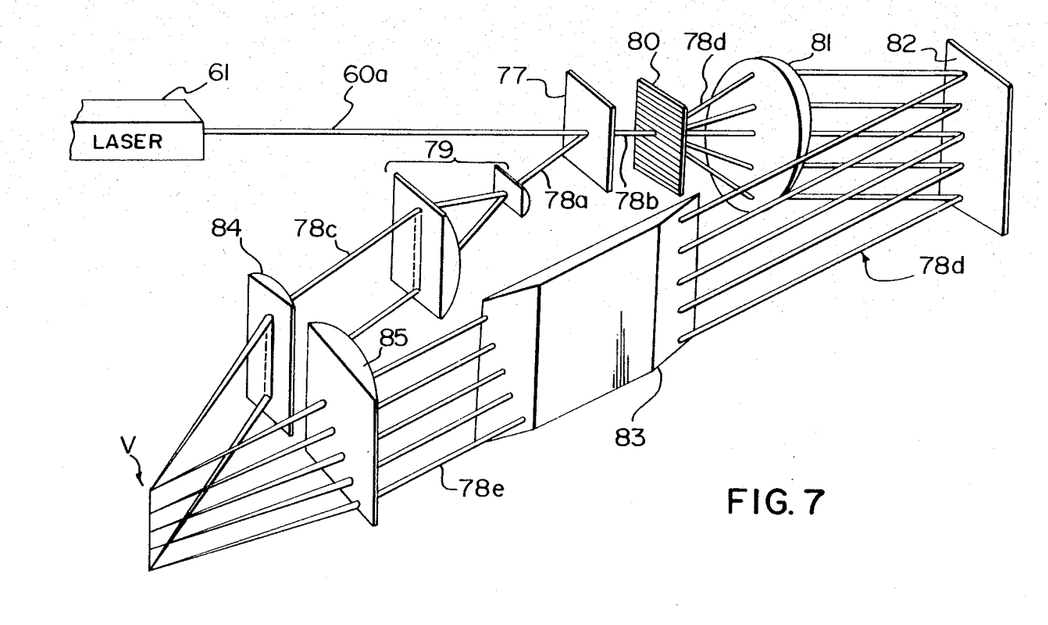
FIGS. 7 and 8 illustrate optical arrangements utilizing line gratings.
Figure 8:
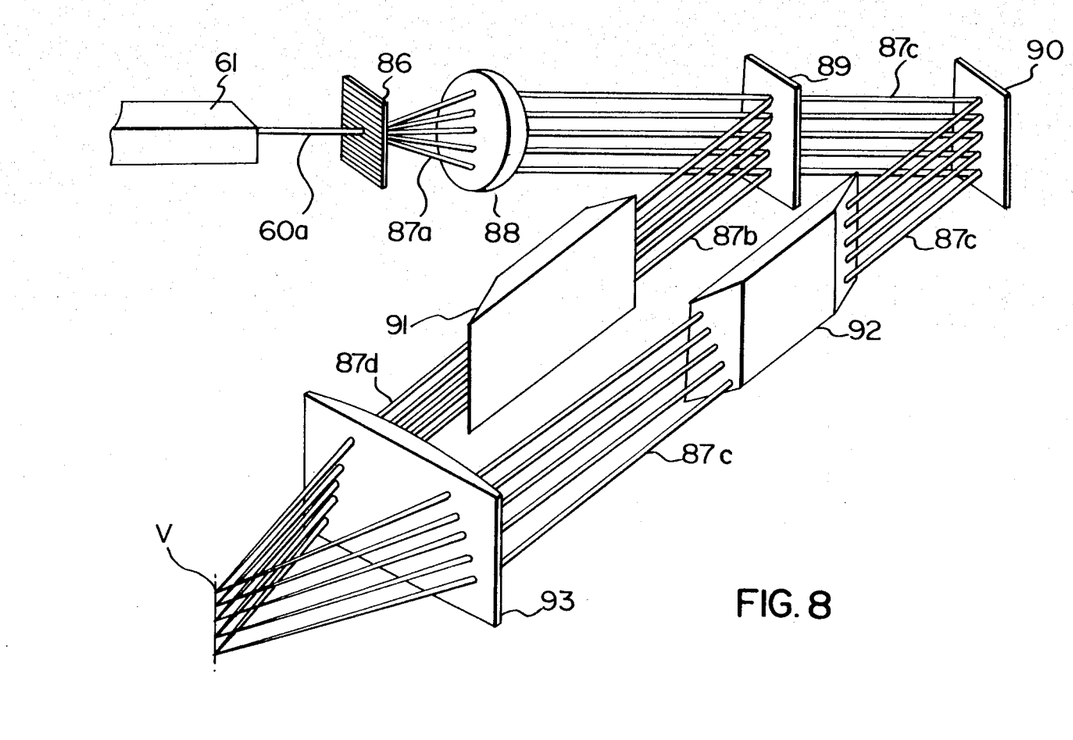

The apparatus described above provides a very economical system for producing distinctive measuring control volumes, however, it has been found that careful order selection is required when closely spaced measuring control volumes are used. FIGS. 7 and 8 illustrate systems which use small parallel line gratings to produce the separate beams.

In FIG. 7, the narrow beam 60a generated by the laser 61 is first directed to a beam splitter 77, where it is split into two components 78a and 78b. One component, 78a, of the beam 60a is then expanded into an elongated beam 78c by a cylindrical telescope 79. The remaining component, 78b, is directed to a grating 80 which separates the beam 78b into beams 78d. The beams 78d are rendered parallel by a focal lens 81 and these beams 78d are directed by a mirror 82 to the beam rotator, which, once again, may consist of a dove prism 83. The prism 83 produces rotated beams 78e which, by means of a single cylindrical lens or a pair of cylindrical lenses 84 and 85, will be focussed with beam 78c to form the measuring control volume V. The detection apparatus will be similar to that in FIG. 6.

In the system shown in FIG. 8, the beam 60a from laser 61 is immediately separated by a line grating 86 into a number of beams 87a. Beams 87a are rendered parallel by a focal lens 88 and are directed to a beam splitter 89 which splits each of the beams 87a into two components 87b and 87c. The beams 87c are redirected parallel to beams 87b by a mirror 90 and then, both sets of beams 87b and 87c are rotated by beam rotators, such as dove prisms 91 and 92. The rotated beams 87d and 87e are focussed by a cylindrical lens 93 to form the measuring control volume V. As in the other embodiments, the single cylindrical lens 93 may be replaced by a pair of cylindrical lenses.

Figure 9:
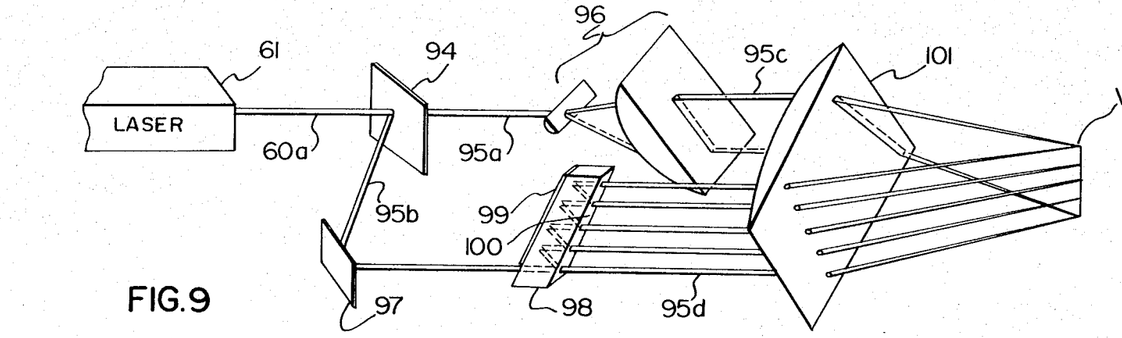
FIGS. 9 and 10 illustrate optical arrangements utilizing beam splitter blocks.
Figure 10:
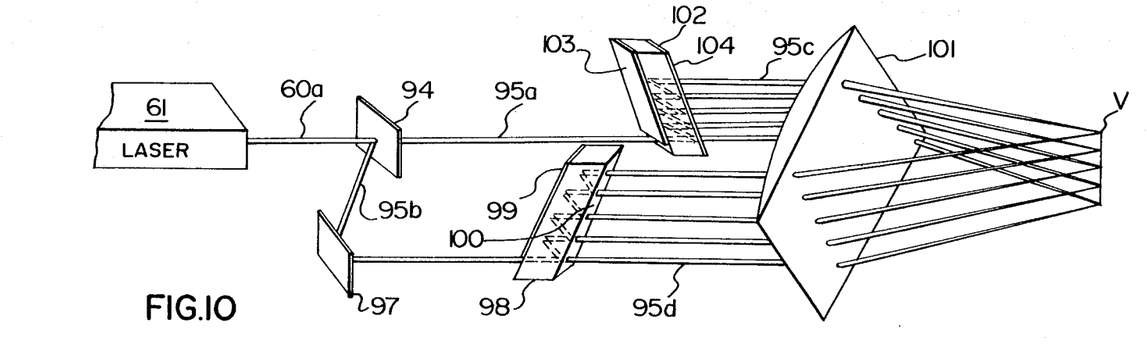

In the embodiments illustrated in FIGS. 9 and 10, the beam 60a from laser 61 is first split by a beam splitter 94 into narrow beams 95a and 95b. In FIG. 9, beam 95a is directed to cylindrical telescope 96 where it is expanded into an elongated beam 95c, which is rotated at the same time. Beam 95b is redirected by mirror 97 onto a beam splitting block 98 having a totally reflecting back surface 99 and a partially reflecting front surface 100 to form a number of beams 95d. The back reflecting surface 99 must start above the entrance point of the beam 95b into the block 98. The reflecting surface 100, on the beam splitting block, can be designed such that the intensity of each beam 95d is similar in intensity in order to simplify the read-out. The block 98 may also be positioned to provide output beams 95d which are rotated. Beam 95c and beams 95d are directed through a cylindrical lens 101 to be focussed and to form volumes V.

The embodiment shown in FIG. 10 is similar to the one shown in FIG. 9, except that the cylindrical telescope 96 is replaced by a beam splitting block 102 similar to block 98, with its totally reflective back surface 103 and partially reflective front surface 104. Block 102 splits beams 95a into a set of beams 95c, each being, preferably, of the same intensity.

Figure 11:
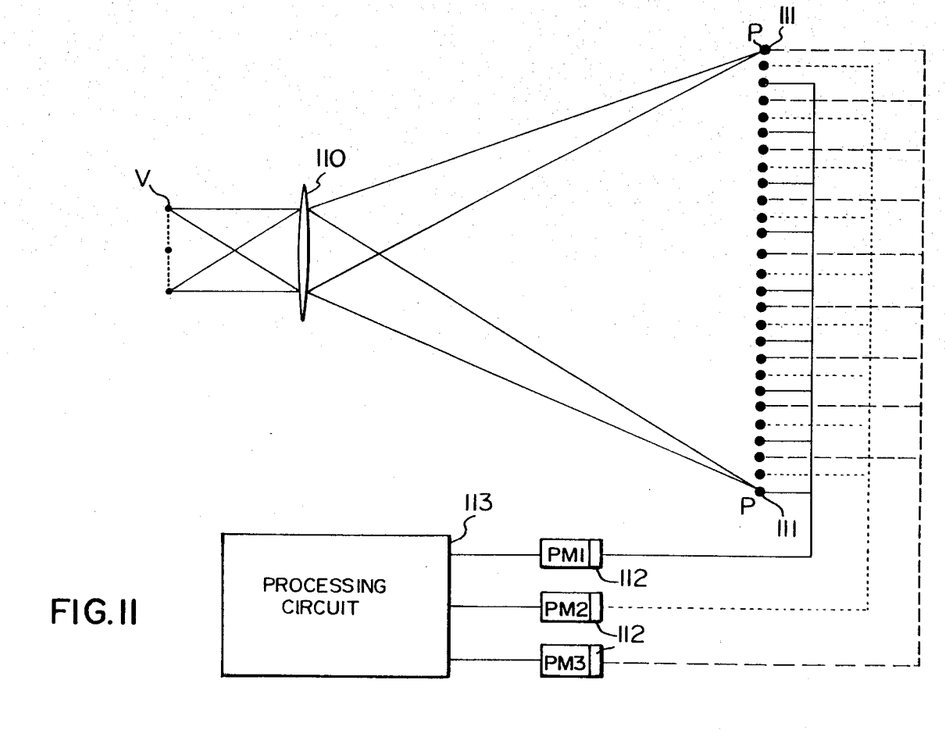
FIG. 11 illustrates a detection circuit having three detectors.

For most applications, the above laser Doppler anemometers would only require one detection system. However, if a large number of measuring control volumes V are required for an application in which the distance between adjacent control volumes is small, the intersecting angles of the laser beams in adjacent control volumes will be similar. The Doppler signals from adjacent control volumes would, therefore, be difficult to distinguish and, therefore, resolve. The detection system illustrated in FIG. 11 can be used to overcome this difficulty. The large number of closely spaced volumes V are imaged by means of a lens 110 onto a plane P at some distance away to gain spacing between the control volumes V. At plane P, optical fibers 111 are arranged to pick up the Doppler signals from each reimaged control volume. However, in order to avoid mixing very similar signals, the signals from adjacent volumes are directed to different photomultipliers 112. In FIG. 11, three photomultipliers 112 are shown, such that each photomultiplier receives signals from a third of the optical fibers 111. Each photomultiplier 112 is coupled to the processing circuitry 113 so that the signals from each photomultiplier 12 can be processed separately, and then the velocity profile for the entire system can be computed.

Many modifications in the above described embodiments of the invention can be carried out without departing from the scope thereof and, therefore, the scope of the present invention is intended to be limited only by the appended claims.

I claim:

1. A multiple measuring-control volume laser Doppler anemometer comprising:
    laser means for generating an optical beam;
    means for transforming the optical beam to produce a number V of measuring control volumes wherein each control volume has two focussed optical beams intersecting at a unique predetermined angle $\phi$, wherein the angles $\phi_1, \phi_2, \ldots \phi_n$ for the different control volumes each differ from one another, the optical beam transforming means having:
        means for broadening the optical beam into an elongated beam;
        means for splitting the elongated beam into a first elongated beam and a second elongated beam;
        means for gating the first elongated beam into V parallel beams; and
        means for causing the second elongated beam to intersect with the V parallel beams to form the control volumes; and
    means for detecting the scattered light from measuring control volumes for determining the velocity at each of the control volumes.

2. A multiple measuring control volume laser Doppler anemometer comprising:
    laser means for generating an optical beam;
    means for transforming the optical beam to produce a number V of measuring control volumes wherein each control volume has two focussed optical beams intersecting at a unique predetermined angle $\phi$, wherein the angles $\phi_1, \phi_2, \ldots \phi_n$ for the different control volumes each differ from one another, the optical beam transforming means having:
        means for splitting the optical beam into a first beam and a second beam;
        means for splitting the first beam into a V number of beams;
        means for broadening the second beam into an elongated beam; and
        means for causing the elongated beam to intersect with the V number of beams to form the control volumes; and
    means for detecting the scattered light from measuring control volumes for determining the velocity at each of the control volumes.

3. A multiple measuring-control volume laser Doppler anemometer as claimed in claim 1 or 2 wherein the detecting means comprises:
    photodetector means for converting scattered light into an electrical signal output;
    means for focussing the scattered light from the volumes onto the photodetector means; and
    processing means coupled to the photodetector means for determining the velocity at each of the control volumes from the electrical signal output.

4. A multiple measuring-control volume laser Doppler anemometer as claimed in claim 1 or 2 wherein the detecting means comprises:
    two or more photodetector means for converting light into electrical signal outputs;
    means for imaging the scattered light from the control volumes onto a plane;
    means for conducting light from the imaged control volumes on the plane to the photodetector means where light from adjacent volumes is conducted to different photodetector means; and
    processing means coupled to the photodetector means for determining the velocity at each of the control volumes from the electrical signal outputs.

5. A multiple measuring control volume laser Doppler anemometer comprising:
    laser means for generating an optical beam;
    means for transforming the optical beam to produce a number V of measuring control volumes wherein each control volume has two focussed optical beams intersecting at a unique predetermined angle $\phi$, wherein the angles $\phi_1, \phi_2, \ldots \phi_n$ for the different control volumes each differ from one another, the optical beam transforming means having:

means for splitting the optical beam into a V number of beams;

means for splitting the V number of beams into a first set of V beams and a second set of V beams; and means for causing each of the beams in the first set of V beams to intersect with a different beam in the second set of V beams to form the control volumes; and means for detecting the scattered light from measuring control volumes for determining the velocity at each of the control volumes.

6. A multiple measuring control volume laser Doppler anemometer comprising:

laser means for generating an optical beam;

means for transforming the optical beam to produce a number V of measuring control volumes wherein each control volume has two focussed optical beams intersecting at a unique predetermined angle $\phi$, wherein the angles $\phi_1, \phi_2 \ldots \phi_n$ for the different control volumes each differ from one another, the optical beams transforming means having:

means for splitting the optical beam into a first beam and a second beam;

means for splitting the first beam into a V number of beams;

means for splitting the second beam into a V number of beams; and means for causing each of the V beams from the first beam to intersect with each of the V beams from the second beam to form the control volumes; and means for detecting the scattered light from measuring control volumes for determining the velocity at each of the control volumes.

7. A multiple measuring control volume laser Doppler anemometer as claimed in claims 5 or 6 wherein the detecting means comprises:

photodetector means for converting scattered light into an electrical signal output;

means for focussing the scattered light from the control volumes onto the photodetector means; and processing means coupled to the photodetector means for determining the velocity at each of the control volumes from the electrical signal output.

8. A multiple measuring control volume laser Doppler anemometer as claimed in claim 5 or 6 wherein the detecting means comprises:

two or more photodetector means for converting light into electrical signal outputs;

means for imaging the scattered light from the control volumes onto a plane;

means for conducting light from the imaged control volumes on the plane to the photodetector means where light from adjacent volumes is conducted to different photodetector means; and processing means coupled to the photodetector means for determining the velocity at each of the control volumes from the electrical signal outputs.

* * * * *